(12) United States Patent
Kozawa (10) Patent No.: US 10,739,322 B2
(45) Date of Patent: Aug. 11, 2020

(54) IN-WAVEFORM PEAK END POINT DETECTING METHOD AND DETECTING DEVICE

(71) Applicant: SHIMADZU CORPORATION, Kyoto-shi, Kyoto (JP)

(72) Inventor: Hiroaki Kozawa, Omihachiman (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 139 days.

(21) Appl. No.: 15/027,763

(22) PCT Filed: Oct. 17, 2013

(86) PCT No.: PCT/JP2013/078199
§ 371 (c)(1),
(2) Date: Apr. 7, 2016

(87) PCT Pub. No.: WO2015/056329
PCT Pub. Date: Apr. 23, 2015

(65) Prior Publication Data
US 2016/0238575 A1  Aug. 18, 2016

(51) Int. Cl.
*G01N 30/86* (2006.01)
(52) U.S. Cl.
CPC .............. *G01N 30/8631* (2013.01)
(58) Field of Classification Search
CPC .......... G01N 30/8624; G01N 30/8631; G06K 9/0053; G06T 7/13; G06T 7/136
See application file for complete search history.

(56) References Cited

U.S. PATENT DOCUMENTS

| 4,752,888 A * | 6/1988 | Yoshihara ............ G06K 9/0053 702/32 |
| 6,081,768 A * | 6/2000 | Hu .................... G01R 19/04 361/78 |
| 2010/0283785 A1* | 11/2010 | Satulovsky ......... G01N 27/447 345/440 |

OTHER PUBLICATIONS

Written Opinion for PCT/JP2013/078199 dated Dec. 24, 2013. [PCT/ISA/237].
Shaun Quinn et al., "Taking the Pain Out of Chromatographic Peak Integration," DIONEX Corporation, 2009, pp. 1-5.
International Search Report of PCT/JP2013/078199 dated Dec. 24, 2013.

\* cited by examiner

*Primary Examiner* — Kyle R Quigley
(74) *Attorney, Agent, or Firm* — Sughrue Mion, PLLC (57) ABSTRACT

A device for detecting a peak end point including a peak end point position detecting unit for using, as a base point, a position on horizontal axis at which a local maximum value is obtained to detect, as a position on horizontal axis of a peak end point, a first point at which a value of the inflection point extraction waveform decreases to the relative threshold value in a direction farther from a position on horizontal axis corresponding to the peak top position, and detecting, as the peak end point, a point on the peak detection target waveform corresponding to the position on horizontal axis of the peak end point.

10 Claims, 5 Drawing Sheets

90 PEAK DETECTION TARGET WAVEFORM
92 START POINT
91 CONVEX HULL
93 FINISH POINT

Fig. 10

IN-WAVEFORM PEAK END POINT DETECTING METHOD AND DETECTING DEVICE

CROSS REFERENCE TO RELATED APPLICATIONS

This is a National Stage of International Application No. PCT/JP2013/078199 filed Oct. 17, 2013, the contents of which are incorporated herein by reference in its entirety.

TECHNICAL FIELD

The present invention relates to a method of detecting the start point and the finish point of a peak (hereinafter, collectively referred to as "peak end points") in a chromatogram or a mass chromatogram. The present invention also relates to a peak end point detecting method in other fields that quire peak end point detection, in addition to detection from a chromatogram.

BACKGROUND ART

When a qualitative analysis or a quantitative analysis on a sample is performed based on a peak in a chromatogram, a spectrum, or the like, the end points of the peak are first determined, and a quantitative analysis is performed using numerical values of the peak width, the peak intensity, the peak area, and the like of the peak defined by the determined peak end points. At this time, the measured peak waveform is approximated by (or fitted to) a known function form such as the form of a Gaussian function or a Lorentzian function to facilitate the determination of the peak end points, so that the numerical values of the peak width, the peak intensity, the peak area, and the like can be easily calculated.

However, a peak waveform in a chromatogram, a spectrum, or the like is not often obtained as a typical curve such as a known function form, and a baseline drift in which a baseline corresponding to background components rises or drops exists in some cases. Moreover, due to various noise components such as noise generated in a detector used for measurement, minor fluctuations arise on the baseline in some cases. This unsmooth waveform obtained through measurement is one of the causes for deteriorating the accuracy of a quantitative analysis.

The baseline of a peak is generally defined by a line connecting the start point (rising position) and the finish point (falling position) of the peak. Because the detection accuracy of the baseline of a peak directly influences the size of the peak area, inappropriate setting of the baseline, that is, inappropriate determination of the start point and the finish point of the peak, is another one of the causes for lowering the accuracy of a quantitative analysis.

Accordingly, in order to improve the accuracy of a quantitative analysis, it is required to appropriately determine the start point and the finish point of a peak even if a baseline drift exists.

Figure 1:
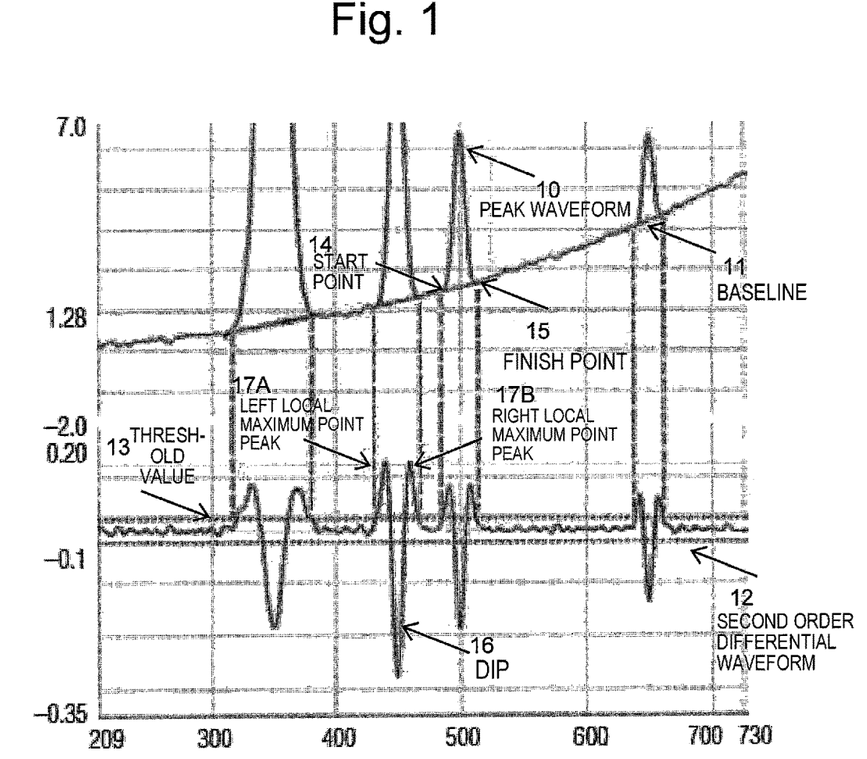
FIG. 1 is a diagram for describing a conventional method of determining the start point and the finish point of a peak.

FIG. 1 illustrates a method for determining the start point and the finish point of a peak while eliminating influences of a baseline drift. This method includes: obtaining a second order differential waveform 12 of a peak waveform 10; determining a threshold value 13 for a second order differential value from estimated noise intensity and the like; and determining a start point 14 and a finish point 15 of a peak in the peak waveform 10 from the relation between the second order differential waveform 12 and the threshold value 13 (see Non Patent Literature 1). Specifically, the points that intersect with the a line having the threshold value 13 at the foots of the second order differential waveform 12 outside the left local maximum point peak 17A and the right local maximum point peak 17B (which respectively correspond to the inflection points in the peak waveform 10) flanking the dip 16 are determined as the start point 14 and the finish point 15. The baseline 11 is the line connecting the start point 14 and the finish point 15.

Figure 2:
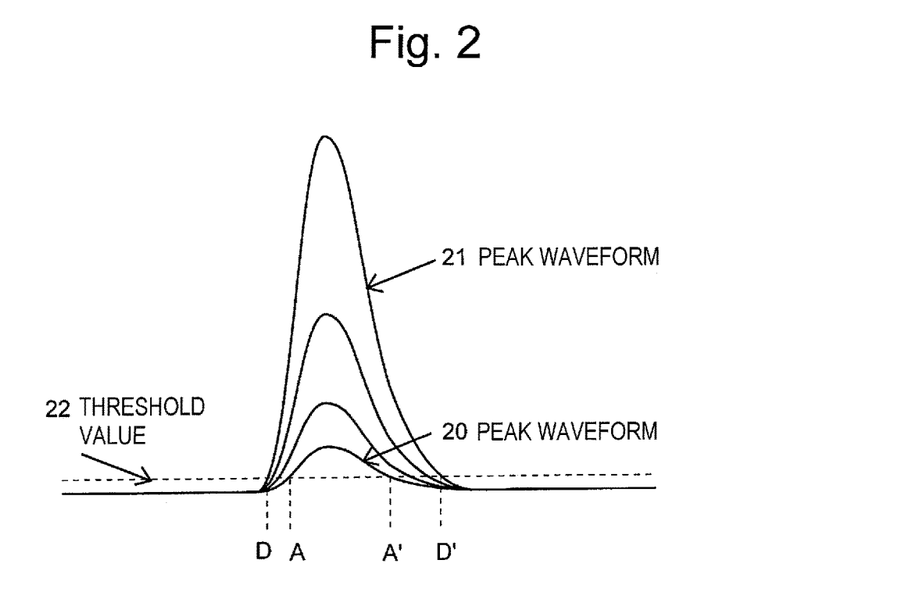
FIG. 2 is a diagram for describing problems in the conventional method of determining the start point and the finish point of a peak.

FIG. 2 illustrates a plurality of peak waveforms respectively magnified (expanded/shrunk) at different vertical magnification ratios. When, as described above, a fixed threshold value 22 is applied to every peak to determine the start point and the finish point of a peak in each of the plurality of peak waveforms, the start point and the finish point are at A and A' in the low magnification peak waveform 20, whereas they are at D and D' in the high magnification peak waveform 21. This means that the start point and the finish point of the peak are different depending on the magnification ratio of each peak waveform. This leads to a problem that the linearity of the peak area among peaks magnified at different magnification ratios is not assured. The linearity is critical in creating a calibration curve in a quantitative analysis.

The peak waveforms in FIG. 2 are examples of asymmetric peak waveforms each having a tailing on one side. Due to the tailing, the distance between the finish points A' and D' is longer than the distance between the start points A and D between the low magnification peak waveform 20 and the high magnification peak waveform 21. In this way, in the case where a peak shape is asymmetric due to a tailing, a leading or the like, the detected start point and the finish point of a peak tend to be significantly shifted toward a peak top position, and this may adversely affect the peak area reproducibility. The "peak top position" refers to the point at which the peak intensity is highest. Here, "the point at which the peak intensity is highest" is not limited to a mathematically strict highest but includes a point at which the peak intensity is substantially highest.

According to such a conventional method in which a threshold value is uniformly applied to every peak, peak end points such as the start point and the finish point of a peak cannot be detected with high accuracy, and the accuracy of a quantitative analysis becomes lower in some cases.

CITATION LIST

Non Patent Literature

Thermo (DIONEX) Software Posters: DIONEX "Taking the Pain Out of Chromatographic Peak Integration", [online], 2009, Dionex Corporation, [searched on Jul. 23, 2013], Internet

SUMMARY OF INVENTION

Technical Problem

An object of the present invention is to provide a method and a device for detecting a peak end point with high accuracy in order to enhance the accuracy of a quantitative analysis.

Solution to Problem

In order to achieve the above-mentioned object, a peak end point detecting method according to the present invention includes the steps of:

a) acquiring an inflection point extraction waveform of a peak detection target waveform;

b) acquiring a peak top position of the peak detection target waveform;

c) detecting a local maximum value of the inflection point extraction waveform and a position on horizontal axis at which the local maximum value is obtained, on any one of right and left sides of the peak top position of the peak detection target waveform;

d) calculating a relative threshold value by multiplying the local maximum value by a relative threshold ratio having a predetermined value of between 0 d 1; and e) using, a base point, the position on horizontal axis at which the local maximum value is obtained to detect, as a position on horizontal axis of a peak end point, a first point at which a value of the inflection point extraction waveform decreases to the relative threshold value in a direction farther from a position on horizontal axis corresponding to the peak top position, and detecting, as the peak end point, a point on the peak detection target waveform corresponding to the position on horizontal axis of the peak end point.

Here, the "inflection point extraction waveform" means a waveform from which an inflection point of the peak detection target waveform can be extracted, and, for example, a second order differential waveform of the peak detection target waveform can be used. Moreover, a waveform that has been subjected to a filtering process may also be used, the filtering process being performed using a frequency filter having properties of a low-cut filter or a band-pass filter, a nonlinear filter used for peak detection, or the like and producing a filtering result having properties similar to those of the second order differential waveform.

In the above-mentioned method, the processing is performed on one of the right and left sides of the peak top position, but, of course, similar processing may be performed on both the right and left sides.

The peak end point detecting method according to the present invention may further include the steps of:

f) determining an intersection point closest to the peak top position in a case where a tangent to the peak top position intersects with another peak adjacent to the peak detection target waveform; and g) correcting the peak end point to a position of the intersection point in a case where the position on horizontal axis of the peak end point is outside a horizontal axis zone corresponding to the peak top position and the intersection point.

The peak end point detecting method according to the present invention may further include the steps of:

h) calculating a convex hull below a peak of the peak detection target waveform; and i) correcting the peak end points to the right and left points closest to the peak top position among points at which the peak detection target waveform is in contact with the convex hull.

Here, the "convex hull below the peak of the peak detection target waveform" means the set of straight line segments connecting a plurality of points at which a virtual sheet and the peak detection target waveform are in contact with each other, the virtual sheet being attached so as to wrap the peak from below the peak.

Moreover, in order to achieve the above-mentioned object, a peak end point detecting device according to the present invention includes:

a) a waveform analyzing unit for acquiring an inflection point extraction waveform of a peak detection target waveform;

b) a peak top position acquiring unit for acquiring a peak top position of the peak detection target waveform;

c) a reference value acquiring unit for detecting a local maximum value of the inflection point extraction waveform and a position on horizontal axis at which the local maximum value is obtained, on any one of right and left sides of the peak top position of the peak detection target waveform;

d) a relative threshold value calculating unit for calculating a relative threshold value by multiplying the local maximum value by a relative threshold ratio having a predetermined value of between 0 and 1; and e) a peak end point position detecting unit for using, as a base point, the position on horizontal axis at which the local maximum value is obtained to detect, as a position on horizontal axis of a peak end point, a first point at which a value of the inflection point extraction waveform decreases to the relative threshold value in a direction farther from a position on horizontal axis corresponding to the peak top position, and detecting, as the peak end point, a point on the peak detection target waveform corresponding to the position on horizontal axis of the peak end point.

The peak end point detecting device according to the present invention may further include:

f) a correction position detecting unit for determining an intersection point closest to the peak top position in a case where a tangent to the peak top position intersects with another peak adjacent to the peak detection target waveform; and g) a peak adjacency correcting unit for correcting the peak end point to a position of the intersection point in a case where the position on horizontal axis of the peak end point is outside a horizontal axis zone corresponding to the peak top position and the intersection point.

The peak end point detecting device according to the present invention may further include:

h) a convex hull detecting unit for calculating a convex hull below a peak of the peak detection target waveform; and i) a peak convex hull correcting unit for correcting the peak end points to the right and left points closest to the peak top position among points at which the peak detection target waveform is in contact with the convex hull.

Advantageous Effects of Invention

Using the peak end point detecting method and device according to the present invention, the threshold value (relative threshold value) based on the peak shape of the peak detection target waveform is calculated, and hence the peak end point can be detected with high accuracy.

In the peak end point detecting method and device according to the present invention, the operation of calculating the relative threshold value by multiplying the local maximum value of the inflection point extraction waveform of the peak detection target waveform by the relative threshold ratio having the predetermined value of between 0 and 1 is performed for each inflection point of the peak detection target waveform. Accordingly, in the case where the peak detection target waveform has an asymmetric peak, the start point and the finish point of the peak are determined by different relative threshold values.

When the peak end point detecting method and device according to the present invention are used for a plurality of peaks that are vertically magnified (expanded/shrunk) at different ratios, the relative threshold value is calculated for each peak. Accordingly, in the case where a peak is magnified at a certain ratio, the local maximum value of the inflection point extraction waveform concerning the peak is also magnified at the same ratio, and hence the peak end point can be determined at the same position maintaining the linearity between peaks magnified at various ratios. As a result, the linearity of the peak area between peaks magnified at different ratios can be maintained, where the linearity is critical in creating a calibration curve in a quantitative analysis.

BRIEF DESCRIPTION OF DRAWINGS

FIG. 6A and FIG. 6B are diagrams for describing peak end point detection results in the case of using the peak end point detecting device of the embodiment.

DESCRIPTION OF EMBODIMENTS

Hereinafter, embodiments of the present invention will be described.

Embodiment 1

Figure 3:
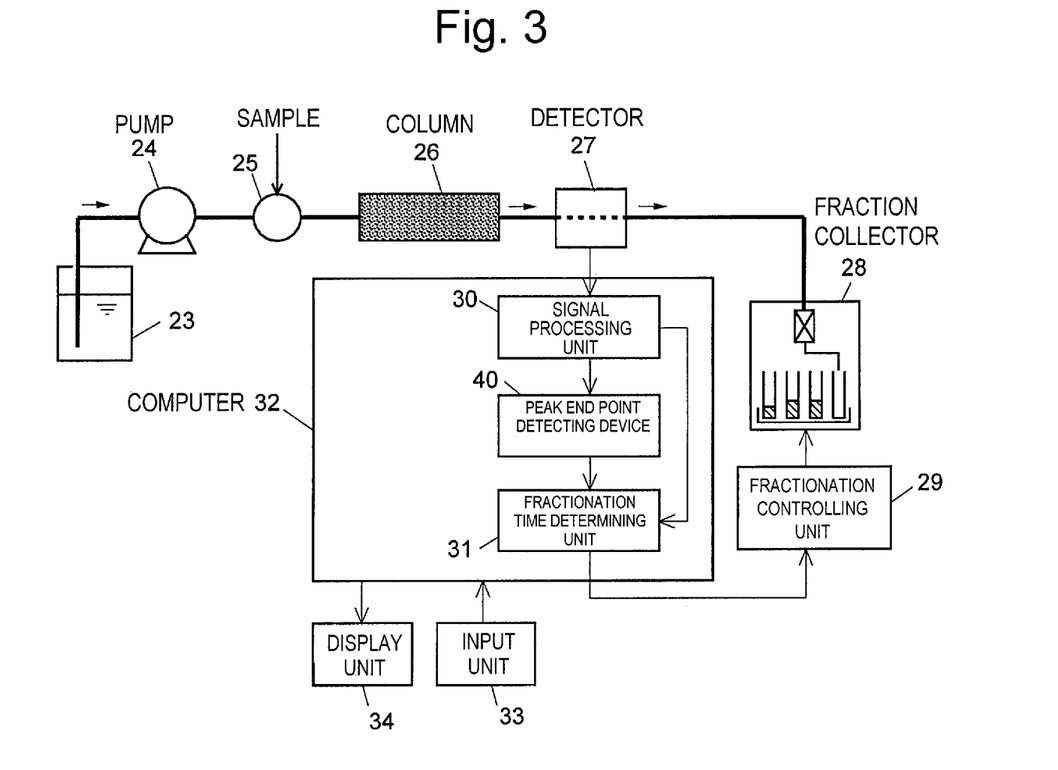
FIG. 3 is a block diagram illustrating a main configuration of a preparative chromatograph system.

A peak end point detecting device of an embodiment of the present invention will be described with reference to FIG. 3 to FIG. 5 and FIG. 10. FIG. 3 is a block diagram illustrating a main configuration of a preparative liquid chromatograph system including a peak end point detecting device 40 of the present embodiment. Eluent (mobile phase) stored in an eluent tank 23 is suctioned by a liquid feed pump 24, and is fed to a column 26 via a sample introducing unit 25 at a fixed flow rate. A sample solution that has been injected into the mobile phase by the sample introducing unit 25 is introduced to the column 26 while being carried by the mobile phase, and components of the sample solution are temporally separated and eluted while passing through the column 26. A detector 27 as an ultraviolet-visible spectrophotometer sequentially detects the components eluted from the column 26, and sends detection signals to a signal processing unit 30. The entirety or a part of the eluate that has passed through the detector 27 is introduced to a fraction collector 28. The signal processing unit 30 creates a chromatogram based on the detection signals obtained from the detector 27.

A user performs waveform processing such as fining on peaks in the chromatogram and analyzes the peaks, using the peak end point detecting device 40.

Figure 4:
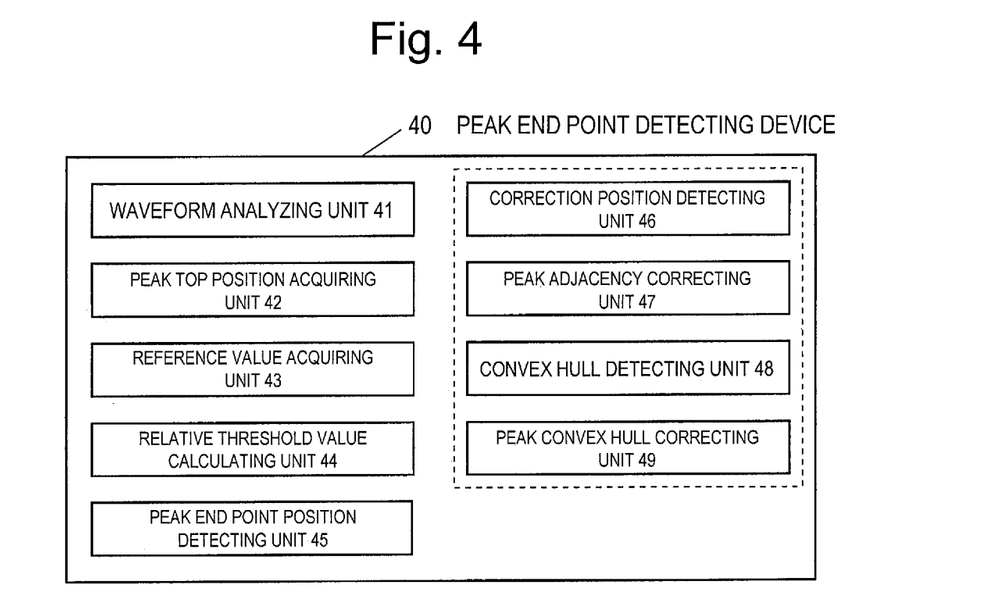
FIG. 4 is a schematic configuration diagram of a peak end point detecting device of an embodiment.

FIG. 4 is a schematic configuration diagram of the peak end point detecting device of the embodiment of the present invention. The peak end point detecting device 40 includes a waveform analyzing unit 41, a peak top position acquiring unit 42, a reference value acquiring unit 43, a relative threshold value calculating unit 44, and a peak end point position detecting unit 45, as its functional blocks.

The signal processing unit 30, the functional blocks included in the peak end point detecting device 40, and a fractionation time determining unit 31 are embodied by a computer 32, and the computer 32 includes an input unit 33 such as a keyboard and a mouse and a display unit 34 such as a display, as its peripherals.

The signal processing unit 30 display's the created chromatogram on the display unit 34, and prompts the user to specify a peak detection target waveform 50. The user specifies the peak detection target waveform 50 by, for example, clicking the displayed chromatogram with the mouse. As a result, information on the specified peak detection target waveform 50 is transmitted to the computer 32 via the input unit 33. At this time, the peak top position acquiring unit 42 of the peak end point detecting device 40 prompts the user to specify a point (peak top position 51) at which the peak intensity of the peak detection target waveform 50 is highest by, for example, clicking this point with the mouse, and also acquires information on the peak top position 51.

Figure 5:
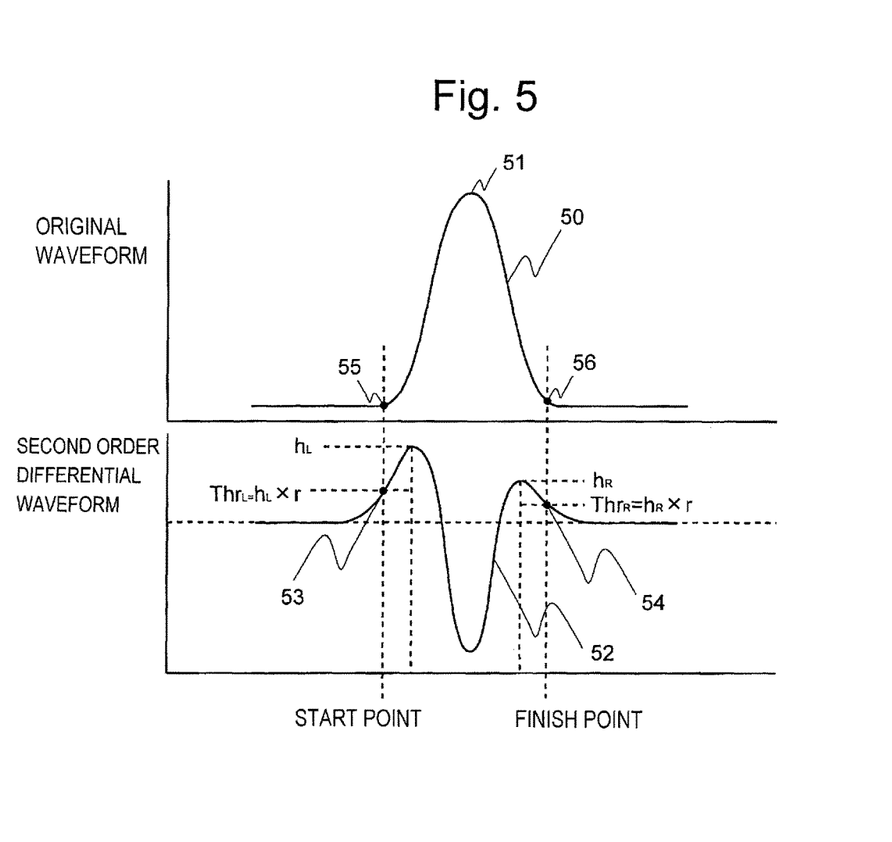
FIG. 5 is a diagram for describing a peak end point detecting method of the embodiment.

When the peak detection target waveform 50 is specified, the waveform analyzing unit 41 of the peak end point detecting device 40 acquires a second order differential waveform 52 of the peak detection target waveform 50. The second order differential waveform 52 is acquired according to a known method such as a method of calculating the increase and decrease in the slope of a tangent to the peak detection target waveform 50. The second order differential waveform 52 corresponds to an "inflection point extraction waveform" in the present invention.

Figure 10:
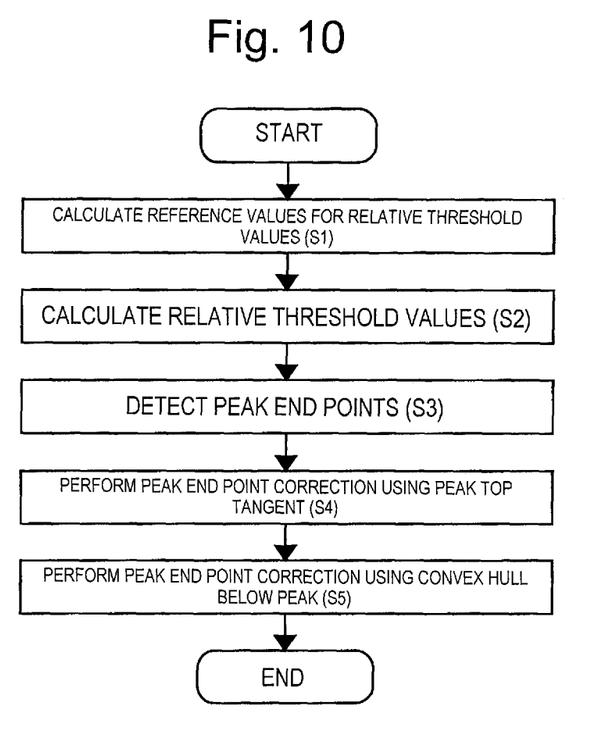
FIG. 10 is a flowchart for describing processing performed by the peak end point detecting device.

The reference value acquiring unit 43 of the peak end point detecting device 40 detects: local maximum values (a left local maximum value $h_L$ and a right local maximum value $h_R$) of the second order differential waveform 52; and positions on horizontal axis at which these local maximum values are respectively obtained, and thus obtains reference values for threshold values (a left relative threshold value $Thr_L$ and a right relative threshold value $Thr_R$) used for detection of peak end points to be described later (FIG. 10: Step S1). If the peak detection target waveform 50 has an asymmetric peak as illustrated in FIG. 5, the heights of the left local maximum value $h_L$ and the right local maximum value $h_R$ of the second order differential waveform 52 have different values from each other.

The relative threshold value calculating unit 44 of the peak end point detecting device 40 calculates the relative threshold values (the left relative threshold value $Thr_L$ and the right relative threshold value $Thr_R$) by multiplying the local maximum values (the left local maximum value $h_L$ and the right local maximum value $h_R$) as the reference values obtained by the reference value acquiring unit 43 by a relative threshold ratio r having a value of between 0 and 1 (FIG. 10: Step S2). In the present embodiment, assuming that the peak detection target waveform follows a Gaussian function (Expression (1)) having a peak intensity A and a width σ, the relative threshold ratio r is determined such that the positions of ±nσ (n: a natural number) are detected as the peak end points. In the following description, n is assumed to be equal to 3.

[Expression 1]

$$f(x) = Ae^{-\frac{x^2}{2\sigma^2}} \quad (1)$$

A second order differential (Expression (2)) of the Gaussian function takes local maximum values when $x=\pm 3^{0.5}\sigma$, and the height of each local maximum value is $g(3^{0.5}\sigma)$. Because $g(x)$ is an even function, the heights of the left and right local maximum values are the same as each other. In order to detect the positions of $x=\pm n\sigma$, the ratio to each local maximum value is calculated, an that Expression (3) given below is obtained. As a result, the relative threshold ratio r that does not depend on σ in the Gaussian function but depends only on n is obtained.

[Expression 2]

$$g(x) = \frac{\partial^2}{\partial x^2} f(x) \quad (2)$$
$$= A \frac{x^2 - \sigma^2}{\sigma^4} e^{-\frac{x^2}{2\sigma^2}}$$

[Expression 3]

$$r = \frac{g(n\sigma)}{g(\sqrt{3}\,\sigma)} \quad (3)$$
$$= \frac{n^2 - 1}{2} e^{-\frac{n^2 - 3}{2}}$$

Next, description will be given of the case of application to a peak waveform that is left-right asymmetric with respect to the peak top position 51 due to a tailing or a leading, such as the actual peak detection target waveform 50.

A ratio $r_{h0}$ (Expression (4)) of a local maximum value and a local minimum value of a second order differential of a Gaussian function is compared with a ratio $r_h$ of a local maximum value and a local minimum value of a second order differential of an actual measured waveform. In the case where $r_{h0} > r_h$, the peak waveform can be regarded as having foot values smaller than those of the Gaussian function. Hence, considering a deformation from the Gaussian function, the ratio obtained by multiplying the relative threshold ratio r in the case of the above-mentioned Gaussian function by $r_h/r_{h0}$ is newly defined as the relative threshold ratio r.

[Expression 4]

$$r_{h0} = \frac{|g(\sqrt{3}\,\sigma)|}{|g(0)|} = 2e^{-\frac{3}{2}} \quad (4)$$

Description has been given above of the example in which the ratio $r_{h0}$ of the local maximum value and the local minimum value of the second order differential of the Gaussian function is compared with the ratio $r_h$ of the local maximum value and the local minimum value of the second order differential of the actual measured waveform, but the present embodiment is not limited to this example. A ratio $r_{w0}$ ($=3^{0.5}$) of a position on horizontal axis corresponding to a peak top position of a Gaussian function and a local maximum value of a second order differential of the Gaussian function is compared with a ratio $r_w$ of a position on horizontal axis corresponding to a peak top position of an actual measured waveform and a local maximum value of a second order differential of the actual measured waveform. In the case where $r_{w0} < r_w$, the ratio obtained by multiplying the relative threshold ratio r in the case of the above-mentioned Gaussian function by $r_{w0}/r_w$ may be newly defined as the relative threshold ratio r.

The relative threshold values (the left relative threshold value $Thr_L$ and the right relative threshold value $Thr_R$) obtained by multiplying the local maximum values (the left local maximum value $h_L$ and the right local maximum value $h_R$) as the reference values obtained by the reference value acquiring unit 43 by the relative threshold ratio r having a value of between 0 and 1 determined as described above reflect the peak shape of the peak detection target waveform 50, and hence the left relative threshold value $Thr_L$ and the right relative threshold value $Thr_R$ are different from each other in some cases.

After the relative threshold values (the left relative threshold value $Thr_L$ and the right relative threshold value $Thr_R$) are obtained, the peak end point position detecting unit 45 of the peak end point detecting device 40 uses, as base points, the positions on horizontal axis at which the local maximum values (the left local maximum value $h_L$ and the right local maximum value $h_R$) of the second order differential waveform 52 acquired by the reference value acquiring unit 43 are respectively obtained to detect, as the positions on horizontal axis of the peak end points, first points 53 and 54 at which the value of the second order differential waveform 52 decreases to the relative threshold values (the left relative threshold value $Thr_L$ and the right relative threshold value $Thr_R$) in directions farther from the position on horizontal axis corresponding to the peak top position acquired by the peak top position acquiring unit 42. Then, the peak end point position detecting unit 45 detects, as the peak end points (the start point and the finish point), points 55 and 56 on the peak detection target waveform respectively corresponding to the positions on horizontal axis of the peak end points (FIG. 10: Step S3).

The fractionation time determining unit 31 determines the start or end time of fractionation by the fraction collector 28, based on information on the peak end points detected by the peak end point detecting device 40, and sends a control signal to a fractionation controlling unit 29. The fractionation controlling unit 29 opens and closes a solenoid valve (fractionation valve) of the fraction collector 28 in response to the control signal, and fractionates the eluate into different vials for each component. In this way, a series of processing by the preparative liquid chromatograph is completed.

Figure 6A:
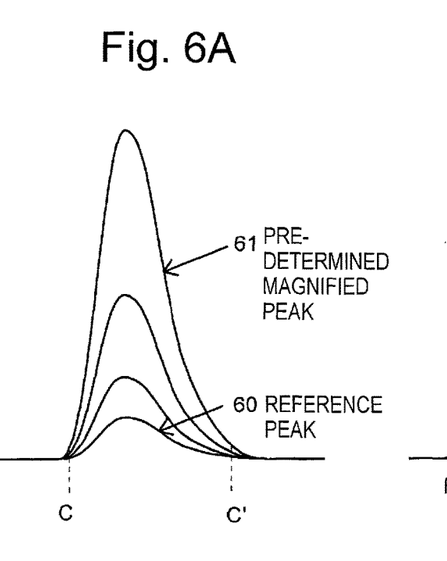
FIG. 6A illustrates a plurality of peaks that are each vertically magnified at a predetermined ratio.

FIG. 6A illustrates a result of detecting the peak end points of a reference peak 60 and a predetermined magnification peak 61 obtained by vertically magnifying the reference peak 60 at a predetermined ratio, according to the present embodiment. Using the peak end point detecting device 40 of the present embodiment, the reference peak 60 and the predetermined magnification peak 61 have a relation of vertical magnification at the predetermined ratio, and hence the positions of inflection points also have the relation of vertical magnification at the predetermined ratio. Accordingly, the local maximum values (the left local maximum value $h_L$ and the right local maximum value $h_R$) of inflection point extraction waveforms also have the relation of vertical magnification at the predetermined ratio. The relative threshold values (the left relative threshold value $\text{Thr}_L$ and the right relative threshold value $\text{Thr}_R$) obtained by multiplying these local maximum values by the same relative threshold ratio r also have the relation of vertical magnification at the predetermined ratio. Consequently, the start point of the reference peak 60 and the start point of the predetermined magnification peak 61 are detected as the same point (C in FIG. 6A), and the finish point of the reference peak 60 and the finish point of the predetermined magnification peak 61 are detected as the same point (C' in FIG. 6A).

Figure 6B:
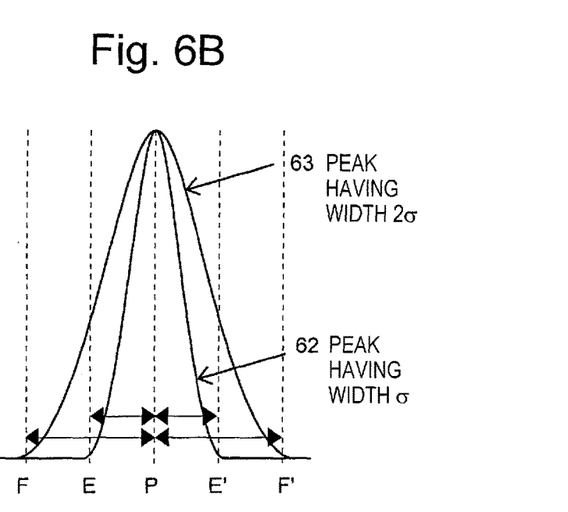
FIG. 6B illustrates a plurality of peaks that are each horizontally magnified at a predetermined ratio.

FIG. 6B illustrates a result of detecting the peak end points of a peak 62 having a width σ and a peak 63 having a width 2σ obtained by horizontally magnifying the peak 62 having the width σ at a predetermined ratio, according to the present embodiment. Using the peak end point detecting device 40 of the present embodiment, the peak 62 having the width σ and the peak 63 having the width 2σ have a relation of the horizontal magnification at the predetermined ratio, and hence the positions of inflection points also have the relation of horizontal magnification at the predetermined ratio. Accordingly, the positions on horizontal axis at which the local maximum values (the left local maximum value $h_L$ and the right local maximum value $h_R$) of inflection point extraction waveforms are respectively obtained also have the relation of horizontal magnification at the predetermined ratio. The positions on horizontal axis at which the relative threshold values (the left relative threshold value $\text{Thr}_L$ and the right relative threshold value $\text{Thr}_R$) obtained by multiplying these local maximum values by the same relative threshold ratio r are respectively obtained also have the relation of horizontal magnification at the predetermined ratio. Consequently, the peak end points are detected at positions at which the respective distances between: a start point F and a finish point F' of the peak 63 having the width 2σ; and a position on horizontal axis P corresponding to the peak top position are predetermined magnification of the respective distances between: a start point E and a finish point E' of the peak 62 having the width σ; and the position on horizontal axis P corresponding to the peak top position.

In this way, it is understood that, in the present embodiment, peak end points are determined at the same positions while the line between peaks that are vertically or horizontally magnified (expanded/shrunk) at various magnification ratios is maintained, unlike a conventional method of determining the start point and the finish point of a peak illustrated in FIG. 2. As a result, the linearity of the peak area between peaks magnified (expanded/shrunk) at different magnification ratios can be maintained, where the linearity is critical in creating a calibration curve in a quantitative analysis.

In the present embodiment, description has been given of the example in which the user specifies the peak top position 51 by clicking the peak top position 51 with the mouse, but the method of acquiring the peak top position 51 is not limited to this example. A local minimum value of the second order differential waveform 52 of the peak detection target waveform 50 may be detected, and a point on the peak detection target waveform 50 corresponding to the local minimum value may be acquired as the peak top position 51.

In the present embodiment, description has been given of the example in which the second order differential waveform 52 is used as the inflection point extraction waveform, but the inflection point extraction waveform is not limited to the second order differential waveform 52. A waveform that has been subjected to a filtering process may also be used, the filtering process being performed using a frequency filter having properties of a low-cut filter or a band-pass filter, a nonlinear filter used for peak detection, or the like and producing a filtering result having properties similar to those of the second order differential waveform. That is, a waveform that has been subjected to a filtering process may also be used, the filtering process removing baseline drift components that sufficiently gradually vary with respect to the peak width and producing such a filtering result that a conversion result of the peak waveform exhibits a shape of "mountain-valley-mountain" or "valley-mountain-valley".

Examples of the frequency filter having properties of a low-cut filter or a band-pass filter include a matched filter using, as its coefficient, a coefficient of a Gaussian filter that is centralized so as to become zero on average. Examples of the nonlinear filter used for peak detection include a nonlinear energy operator (NEO), a smoothed nonlinear operator (SNEO), and a top-hat filter and a bottom-hat filter as a type of morphological filters. In the case where a filtering result exhibits a shape of "valley-mountain-valley", processing similar to the second order differential waveform can be performed by reversing the positive and negative of the filtering result.

Embodiment 2

Figure 7:
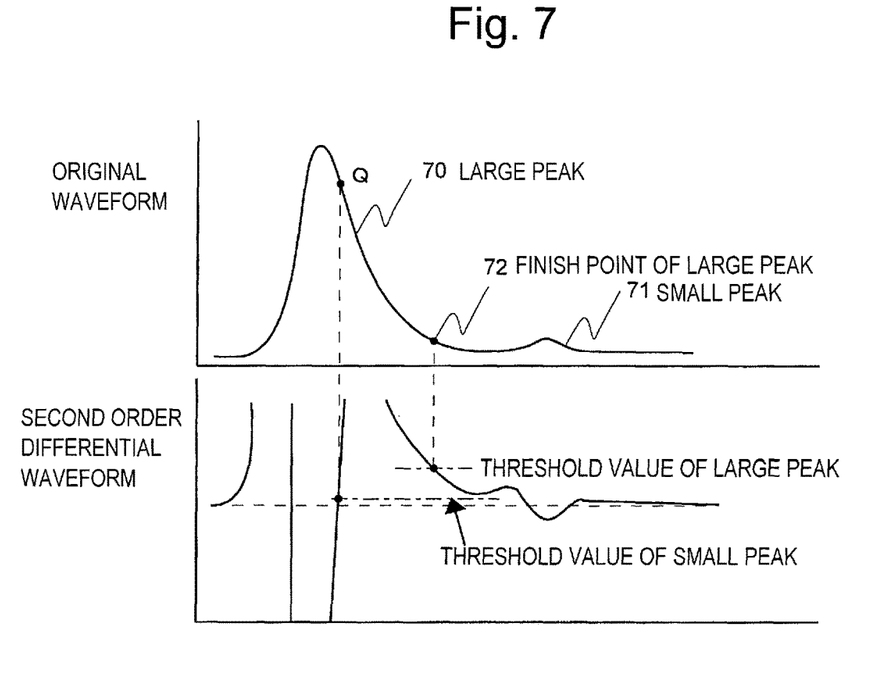
FIG. 7 is a diagram for describing an example in which a peak end point is erroneously detected in the case where an adjacent peak exists.

In the case where another peak adjacent to a peak detection target waveform exists, a peak end point detected according to Embodiment 1 may be at an inappropriate position. FIG. 7 illustrates an example in which a peak end point is erroneously detected. In this example, a small peak 71 is located so as to be buried around the foot on a finish point 72 side of a large peak 70 as illustrated in FIG. 7. In the case where the small peak 71 is a peak detection target waveform, and the peak end point detection of Embodiment 1 is performed on the start point of the small peak, the first point at which the value of the second order differential waveform decreases up to the relative threshold value is detected in a waveform that forms a dip corresponding to the peak top position of the large peak that is another peak adjacent to the peak detection target waveform. As a result, the peak end point of the peak detection target waveform (the start point of the small peak) is erroneously detected as a point Q in FIG. 7. This result derives from the peak end point detection based on another peak adjacent to the peak detection target waveform, which means error detection of the peak end point. In the present embodiment, a peak end point detecting device 40 having a function of correcting a peak end point position detected according to Embodiment 1 in such a case is described.

The peak end point detecting device 40 of the present embodiment includes a correction position detecting unit 46 and a peak adjacency correcting unit 47 as its functional blocks, in addition to the functional blocks of the waveform analyzing unit 41 to the peak end point position detecting unit 45 in Embodiment 1 (see FIG. 4). Description of the waveform analyzing unit 41 to the peak end point position detecting unit 45 denoted by the same reference signs as those in Embodiment 1 is omitted below in order to avoid description overlapping with that in Embodiment 1, and the correction position detecting unit 46 and the peak adjacency correcting unit 47 are described with reference to FIG. 8 and FIG. 10.

Figure 8:
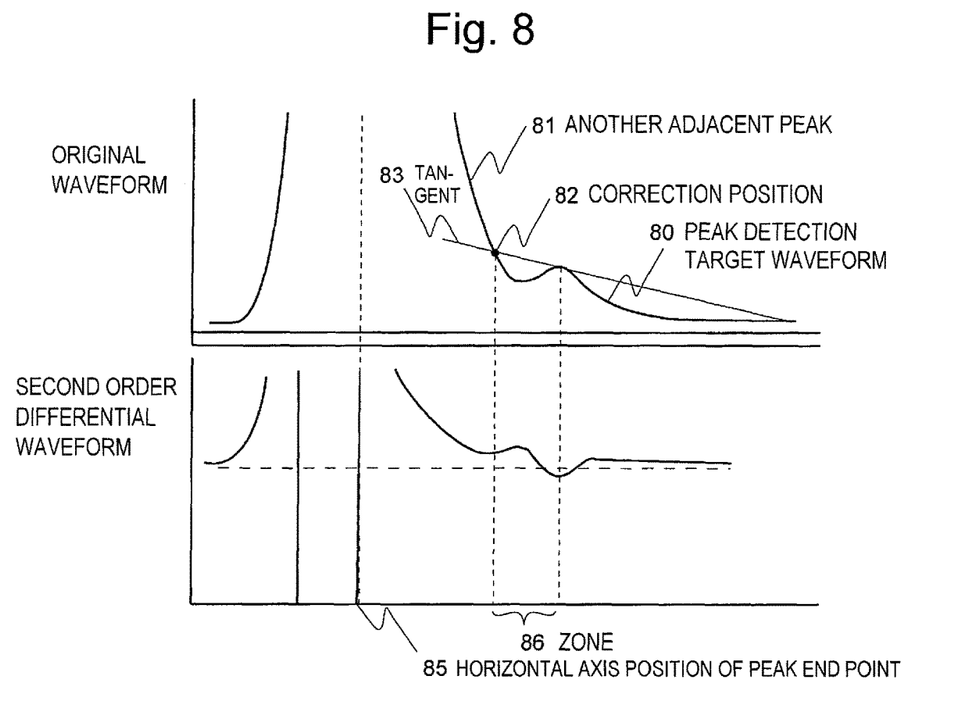
FIG. 8 is a diagram for describing a peak end point correcting method using a tangent to a peak top position.

The correction position detecting unit 46 obtains a tangent 83 to the peak top position of a peak detection target waveform 80, and detects, as a correction position 82, an intersection point closest to the peak top position of the peak detection target waveform 80 among points at which the tangent 83 intersects with an waveform (original waveform) including another peak 81 adjacent to the peak detection target waveform 80. In the case where another peak in proximity to the peak top position exists or the case where a baseline drift that linearly rises or drops exists, the slope of the tangent 83 to the peak top position may not become zero as illustrated in FIG. 8. Moreover, in the case where the user specifies a peak top position by clicking the peak top position, a mathematically strict peak top position is not necessarily specified as the peak top position in the present application, and hence the slope of the tangent 83 to the peak top position may not become zero.

When a position on horizontal axis 85 of a peak end point of the peak detection target waveform 80 that is detected by the peak end point position detecting unit 45 through the procedures described in Embodiment 1 s outside a horizontal axis zone 86 corresponding to the peak top position of the peak detection target waveform 80 and the correction position 82 detected by the correction position detecting unit 46, it is considered that the peak end point is erroneously detected under the influence of the another adjacent peak as illustrated in FIG. 7. Hence, when it is detected that the position on horizontal axis 85 is outside the zone 86, the peak adjacency correcting unit 47 corrects the peak end point of the peak detection target waveform 80 detected according to Embodiment 1 to the correction position 82 (FIG. 10: Step S4). Step S4 in FIG. 10 is a step of correcting the peak end point(s) detected through the processing up to Step S3 described in Embodiment 1, and is not an essential processing step.

Even in the case where another peak adjacent to a peak detection target waveform exists, the peak end point detecting device 40 of the present embodiment including the correction position detecting unit 46 and the peak adjacency correcting unit 47 can correct a peak end point to an appropriate position. Accordingly, a versatile peak end point detecting device can be provided.

Embodiment 3

A peak end point detected according to Embodiment 1 or Embodiment 2 may be at an inappropriate position under the influence of a baseline drift. Specifically, in the case where a peak detection target waveform includes noise or a baseline drift, if a baseline is defined by connecting the start point and the finish point of a peak detected according to Embodiment 1 or Embodiment 2 with a straight line, part of the peak detection target waveform may protrude downward from the baseline. In the present embodiment, a peak end point detecting device 40 having a function of correcting the peak end point position detected according to Embodiment 1 or Embodiment 2 in such a case is described.

The peak end point detecting device 40 of the present embodiment includes a convex hull detecting unit 48 and a peak convex hull correcting unit 49 as its functional blocks, in addition to the functional blocks of the waveform analyzing unit 41 to the peak end point position detecting unit 45 in Embodiment 1 or the functional blocks of the waveform analyzing unit 41 to the peak adjacency correcting unit 47 in Embodiment 2 (see FIG. 4). Description of the waveform analyzing unit 41 to the peak adjacency correcting unit 47 denoted by the same reference signs as those in Embodiment 1 and Embodiment 2 is omitted below in order to avoid description overlapping with that in Embodiment 1 and Embodiment 2, and the convex hull detecting unit 48 and the peak convex hull correcting unit 49 are described with reference to FIG. 9 and FIG. 10.

Figure 9:
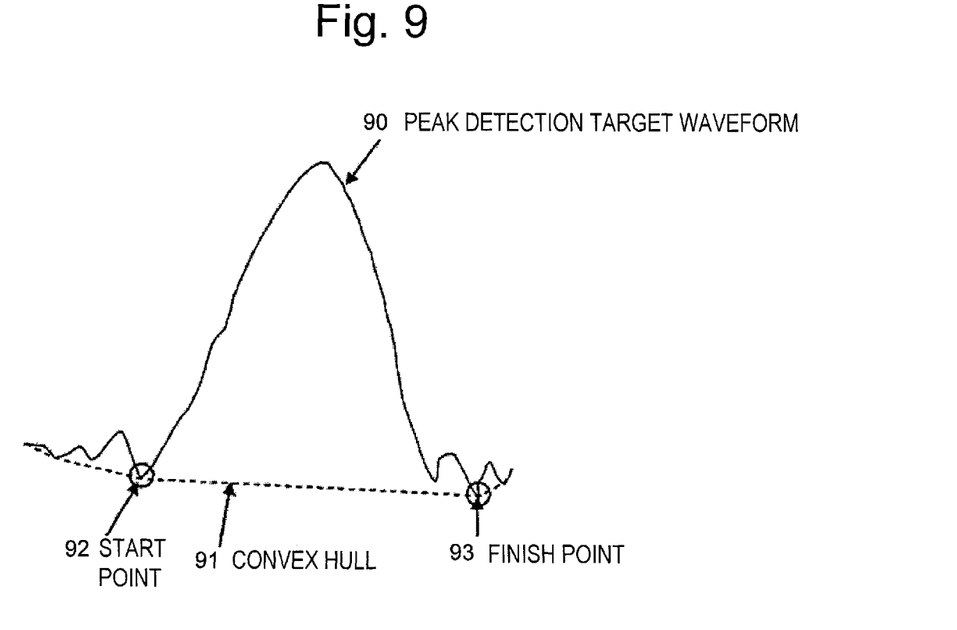
FIG. 9 is a diagram for describing a peak end point correcting method using a convex hull below a peak.

The convex hull detecting unit 48 calculates a convex hull 91 below a peak of a peak detection target waveform 90. The peak convex hull correcting unit 49 corrects peak end points (the start point and the finish point of a peak) detected according to Embodiment 1 or Embodiment 2 to left and right points (a start point 92 and a finish point 93) closest to the peak top position among points at which the peak detection target waveform 90 is in contact with the convex hull 91 (FIG. 10: Step S5). Step S5 in FIG. 10 is a step of correcting the peak end points detected through the processing up to Step S3 described in Embodiment 1 and the processing up to Step S4 described in Embodiment 2, and is not an essential processing step. Even if the correction of the present embodiment is performed in the case where the peak detection target waveform 90 has a complete Gaussian form and includes no noise and no baseline drift, the peak end points detected according to Embodiment 1 do not change.

Even in the case where the baseline of a peak detection target waveform includes a baseline drift, the peak end point detecting device 40 of the present embodiment including the convex hull detecting unit 48 and the peak convex hull correcting unit 49 can correct a peak end point to an appropriate position. Accordingly, a versatile peak end point detecting device can be provided.

REFERENCE SIGNS LIST

10, 20, 21 . . . Peak Waveform
11 . . . Baseline
12 . . . Second Order Differential Waveform
13, 22 . . . Threshold Value
14, 92 . . . Start Point
15, 72, 93 . . . Finish Point
16 . . . Dip
17A . . . Left Local Maximum Point Peak
17B . . . Right Local Maximum Point Peak
40 . . . Peak End Point Detecting Device
41 . . . Waveform Analyzing Unit
42 . . . Peak Top Position Acquiring Unit
43 . . . Reference Value Acquiring Unit
44 . . . Relative Threshold Value Calculating Unit
45 . . . Peak End Point Position Detecting Unit
46 . . . Correction Position Detecting Unit
47 . . . Peak Adjacency Correcting Unit
48 . . . Convex Hull Detecting Unit
49 . . . Peak Convex Hull Correcting Unit
50, 80, 90 . . . Peak Detection Target Waveform
51 . . . Peak Top Position
52 . . . Second Order Differential Waveform
53, 54, 55, 56 . . . Point
60, 61, 62, 63, 70, 71, 81 . . . Peak
82 . . . Correction Position
83 . . . Tangent
85 . . . Position on horizontal axis
86 . . . Zone
91 . . . Convex Hull

The invention claimed is:

1. A peak end point detecting method comprising the steps of:
   a) acquiring an inflection point extraction waveform of a peak detection target waveform of a chromatogram acquired by an analyzing device on a sample solution, the inflection point extraction waveform being a second order differential waveform of the peak detection target waveform;
   b) acquiring a peak top position of a peak of the peak detection target waveform;

c) detecting a local maximum value of the inflection point extraction waveform and a position on a horizontal axis at which the local maximum value is obtained, on any one of right and left sides of the peak top position of the peak of the peak detection target waveform;

d) calculating a relative threshold value by multiplying the local maximum value by a relative threshold ratio which has a predetermined value of between 0 and 1, the relative threshold ratio being calculated by comparing a ratio of a local maximum value and a local minimum value of a second order differential of a Gaussian function with a ratio of the local maximum value and the local minimum value of the inflection point extraction waveform; and e) using, as a base point, the position on the horizontal axis at which the local maximum value is obtained to detect, as a position on the horizontal axis of a peak end point, a first point at which a value of the inflection point extraction waveform decreases to the relative threshold value in a direction farther from a position on the horizontal axis corresponding to the peak top position, and detecting, as the peak end point, a point on the peak detection target waveform corresponding to the position on the horizontal axis of the peak end point.

2. The peak end point detecting method according to claim 1, further comprising the steps of:

f) determining an intersection point closest to the peak top position in a case where a tangent to the peak top position intersects with another peak adjacent to the peak of the peak detection target waveform; and g) correcting the peak end point to a position of the intersection point in a case where the position on the horizontal axis of the peak end point is outside a horizontal axis zone corresponding to the peak top position and the intersection point.

3. The peak end point detecting method according to claim 1, further comprising the steps of:

h) calculating a convex hull below the peak of the peak detection target waveform; and i) correcting the peak end points to right and left points closest to the peak top position among points at which the peak detection target waveform is in contact with the convex hull.

4. The peak end point detecting method according to claim 2, further comprising the steps of:

h) calculating a convex hull below the peak of the peak detection target waveform; and i) correcting the peak end points to right and left points closest to the peak top position among points at which the peak detection target waveform is in contact with the convex hull.

5. The peak end point detecting method according to claim 1, wherein when the peak end point detecting method is used for a plurality of peaks of the peak detection target waveform, the relative threshold value is calculated for each peak.

6. A peak end point detecting device comprising:

a) a waveform analyzing unit configured to acquire an inflection point extraction waveform of a peak detection target waveform of a chromatogram acquired by an analyzing device on a sample solution, the inflection point extraction waveform being a second order differential waveform of the peak detection target waveform;

b) a peak top position acquiring unit configured to acquire a peak top position of a peak of the peak detection target waveform;

c) a reference value acquiring unit configured to detect a local maximum value of the inflection point extraction waveform and a position on a horizontal axis at which the local maximum value is obtained, on any one of right and left sides of the peak top position of the peak of the peak detection target waveform;

d) a relative threshold value calculating unit configured to calculate a relative threshold value by multiplying the local maximum value by a relative threshold ratio which has a predetermined value of between 0 and 1, the relative threshold ratio being calculated by comparing a ratio of a local maximum value and a local minimum value of a second order differential of a Gaussian function with a ratio of the local maximum value and the local minimum value of the inflection point extraction waveform; and e) a peak end point position detecting unit for using, as a base point, the position on the horizontal axis at which the local maximum value is obtained to detect, as a position on the horizontal axis of a peak end point, a first point at which a value of the inflection point extraction waveform decreases to the relative threshold value in a direction farther from a position on the horizontal axis corresponding to the peak top position, and detecting, as the peak end point, a point on the peak detection target waveform corresponding to the position on the horizontal axis of the peak end point.

7. The peak end point detecting device according to claim 6, further comprising:

f) a correction position detecting unit for determining an intersection point closest to the peak top position in a case where a tangent to the peak top position intersects with another peak adjacent to the peak of the peak detection target waveform; and g) a peak adjacency correcting unit for correcting the peak end point to a position of the intersection point in a case where the position on the horizontal axis of the peak end point is outside a horizontal axis zone corresponding to the peak top position and the intersection point.

8. The peak end point detecting device according to claim 6, further comprising:

h) a convex hull detecting unit for calculating a convex hull below the peak of the peak detection target waveform; and i) a peak convex hull correcting unit for correcting the peak end points to right and left points closest to the peak top position among points at which the peak detection target waveform is in contact with the convex hull.

9. The peak end point detecting device according to claim 7, further comprising:

h) a convex hull detecting unit for calculating a convex hull below the peak of the peak detection target waveform; and i) a peak convex hull correcting unit for correcting the peak end points to right and left points closest to the peak top position among points at which the peak detection target waveform is in contact with the convex hull.

10. The peak end point detecting device according to claim 6, wherein when the peak end point detecting method is used for a plurality of peaks of the peak detection target waveform, the relative threshold value is calculated for each peak.

* * * * *